(12) United States Patent
El-Zein

(10) Patent No.: US 6,554,351 B1
(45) Date of Patent: Apr. 29, 2003

(54) MONOCOQUE CAB ASSEMBLY

(75) Inventor: Mohamad S. El-Zein, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/021,193

(22) Filed: Oct. 30, 2001

(51) Int. Cl.$^7$ .............................................. B60R 27/00
(52) U.S. Cl. .................................. 296/190.08; 296/196
(58) Field of Search ...................... 296/190.08, 196, 296/197

(56) References Cited

U.S. PATENT DOCUMENTS

| | | | | |
|---|---|---|---|---|
| 2,816,794 A | * | 12/1957 | Temp .................... | 296/190.08 |
| 3,127,213 A | * | 3/1964 | Klaasen .................... | 296/197 |
| 4,050,735 A | * | 9/1977 | Molnar .................. | 296/190.08 |
| 4,695,342 A | * | 9/1987 | Belleau et al. ......... | 296/190.08 |
| 4,917,435 A | * | 4/1990 | Bonnett et al. ......... | 296/190.08 |
| 4,978,163 A | * | 12/1990 | Savio ........................ | 296/197 |
| 5,018,781 A | * | 5/1991 | Kumasaka et al. ......... | 296/196 |
| 5,150,942 A | * | 9/1992 | Fujan et al. ........... | 296/190.03 |
| 5,314,230 A | | 5/1994 | Hutchison et al. | |
| 5,660,427 A | * | 8/1997 | Freeman et al. ....... | 296/190.08 |
| 5,735,568 A | * | 4/1998 | Arnold .................. | 296/190.02 |
| 5,863,093 A | * | 1/1999 | Novoa et al. .......... | 296/190.08 |
| 6,012,765 A | * | 1/2000 | Novoa et al. .......... | 296/190.08 |
| 6,065,799 A | * | 5/2000 | Suwabe et al. ........ | 296/190.08 |
| 6,076,884 A | * | 6/2000 | Osman .................. | 296/190.08 |
| 6,183,034 B1 | * | 2/2001 | Moody et al. .............. | 296/197 |
| 6,276,477 B1 | * | 8/2001 | Ida .............................. | 296/197 |

* cited by examiner

Primary Examiner—D. Glenn Dayoan
Assistant Examiner—Lori L Coletta

(57) ABSTRACT

A three piece monocoque cab assembly with a base portion having spaced frame members that extend upwardly, a roof portion secured to the base member and having spaced frame members that extend downwardly and mate with the frame members of the base portion, and an interior portion that is nested within and secured to the base portion.

4 Claims, 3 Drawing Sheets

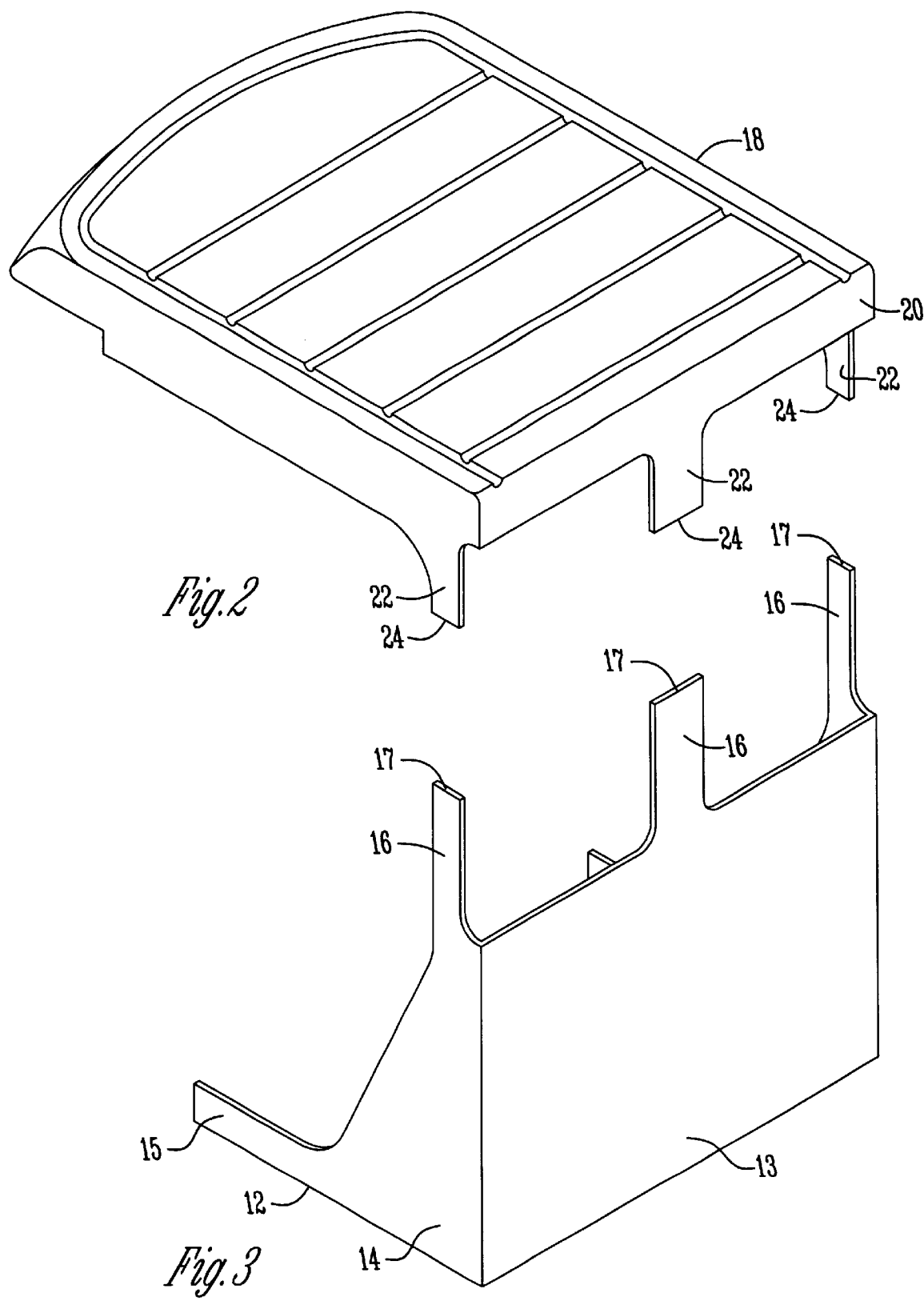

MONOCOQUE CAB ASSEMBLY

BACKGROUND OF THE INVENTION

1. Field of the Invention

The present invention relates to a cab construction for farm implements and the like, and more specifically to a three-piece monocoque cab assembly.

2. Description of the Related Art

The cabs for farm implements are typically manufactured from many individual pieces. These pieces have traditionally been made of metal to withstand the various loads and deflections encountered by the implement. The pieces are either cut and/or stamped and then welded or bolted together. Because of the holes created from the method of assembly, it is difficult to seal the cab from airborne noise even when the holes are caulked. Thus, there is a need for a cab assembly that has the strength and rigidity of a welded metal assembly, while at the same time being capable of sealing the cab from airborne noise.

BRIEF SUMMARY OF THE INVENTION

An object of this invention is to provide a cab assembly that seals the cab from airborne noise.

A further object of the invention is to provide a cab assembly that is strong, rigid, and free from corrosion.

A still further object of the invention is to provide a cab assembly that is economical to manufacture and easy to assemble.

The invention includes three molded pieces that are bonded together to form a monocoque cab structure. Included is a base portion with spaced frame members that extend upwardly from a rearward portion of the base portion. A roof portion having spaced frame members that extend downwardly from a rearward portion of the roof portion is secured to the base portion. The spacing of the frame members of the base portion are located so that lower ends of the spaced members of the roof portion mate with upper ends of the spaced members of the base potion for attachment to each other. Finally, an interior portion is nested within and secured to the base portion.

BRIEF DESCRIPTION OF THE DRAWINGS

FIG. 2 is a perspective view of a roof portion.

FIG. 3 is a perspective view of a base portion.

DESCRIPTION OF THE PREFERRED EMBODIMENT

Figure 1:
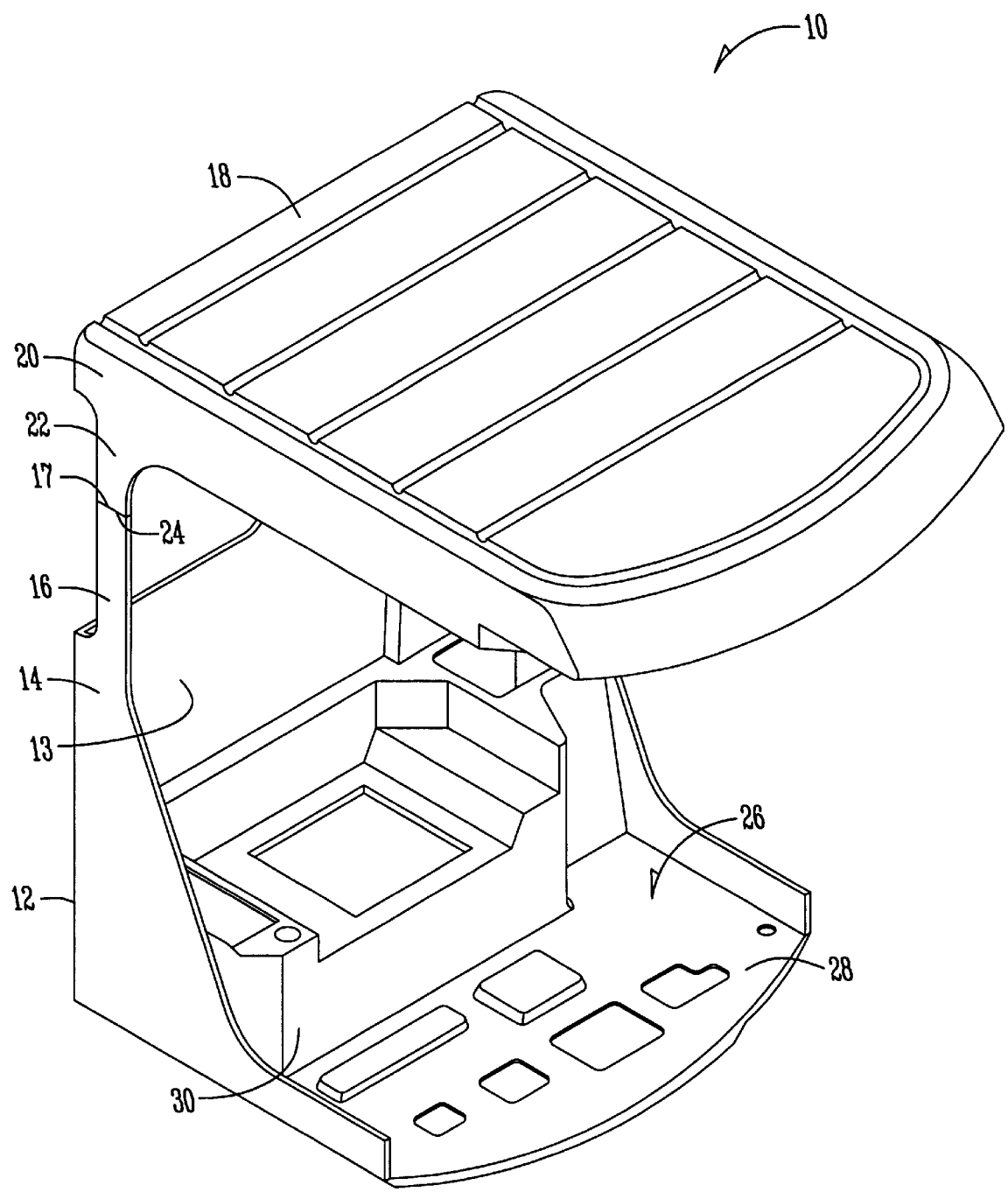
FIG. 1 is a perspective view of the cap assembly with the separate portions assembled to one another.

Looking first to FIG. 1, the monocoque cab assembly 10 is comprised of three parts. The structure and manner of joining these parts is the subject of this invention.

As shown in FIG. 3, the cab assembly includes a base portion 12 that has a rearward portion 14. A plurality of spaced frame members 16 extend upwardly from the rearward portion 14.

A roof portion 18 (FIG. 2) is secured to the base portion 12. The roof portion 18 has a rearward portion 20 from which a plurality of spaced frame members 22 extend downwardly. The frame members 16 of the base portion 12 are spaced and located so that the lower ends 24 of the frame members 22 mate with the upper ends 17 of the frame members 16 of the base portion 14 for attachment to each other as shown in FIG. 1. The frame members 16 of the base portion 12 are bonded to the frame members 22 of the roof portion by applying a desired amount of adhesive for joining the portions and applying pressure until fixed.

Figure 4:
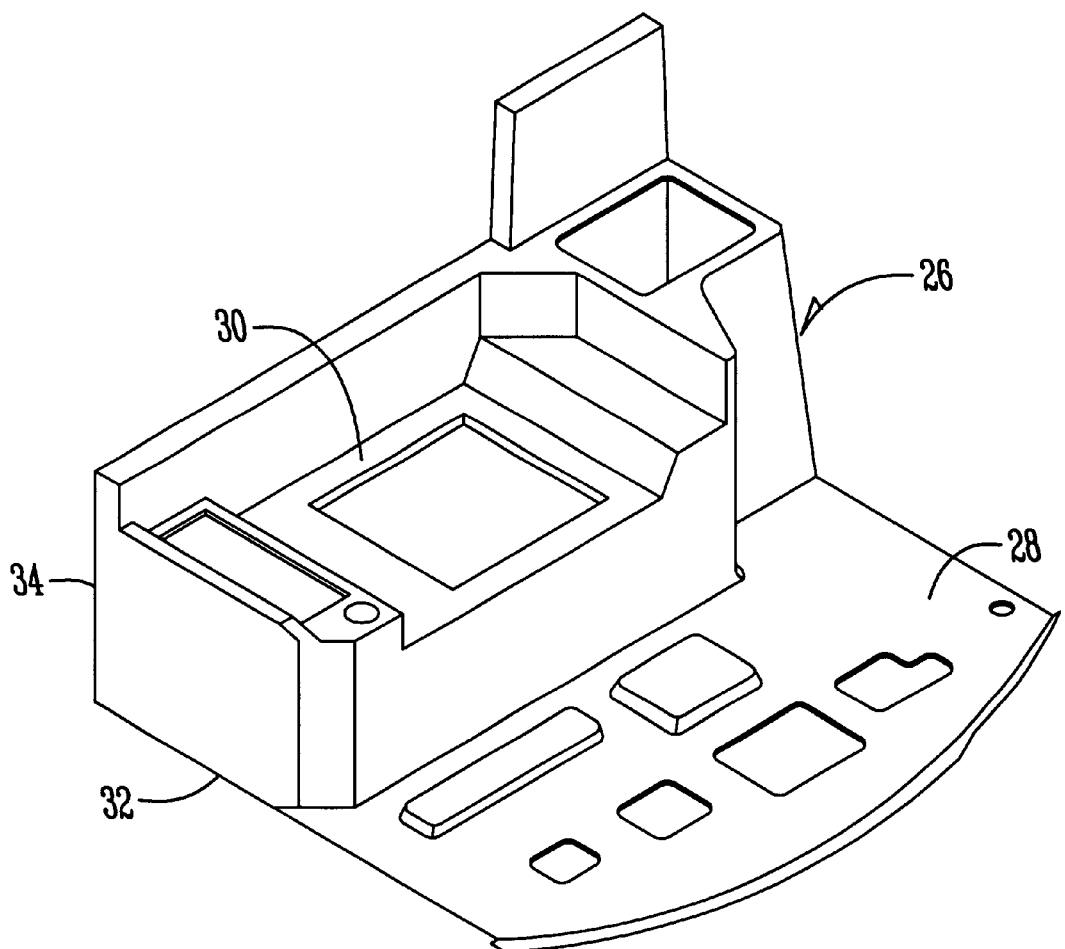
FIG. 4 is a perspective view of an interior portion.

The interior portion 26, as shown in one embodiment of FIG. 4 has a floor section 28 and a panel section 30. Traditionally, the interior portion is made of many parts to accommodate the various components to operate the farm implement. Here, the interior portion 26 is made of one piece. Further, due to the flexibility in the design, many other parts could be added to the final shape.

The interior portion 26 is nested within the base portion and secured thereto. The interior portion 26 is bonded to the base portion 12 by applying a desired amount of adhesive for joining the bottom portion 32 and rearward portion 34 of the interior portion 26 to horizontally extending frame members 15 of the base portion 12 and the back section 13 of the base portion and applying pressure until fixed.

The three portions can be made of any material sufficient to provide the necessary strength and rigidity, but it is preferred that the pieces be made of a polymer composite.

As can be seen from the structure of the three portions and the manner is which they are bonded together, a seal is formed that provides better isolation of airborne noise. Further, because of the flexibility in the design, many parts can be combined in the final shape. Also, the material used to mold the pieces eliminates the problems of corrosion.

Having thus described the invention it should be understood that numerous structural modifications and adaptations may be resorted to without departing from the spirit of the invention.

What is claimed is:

1. A three piece cab construction for farm implements, comprising:

a base portion having spaced frame members extending upwardly from a rearward portion of the base portion, a roof portion secured to the base portion, the roof portion having spaced frame members extending downwardly from a rearward portion of the roof portion, spacing of the frame members of the base portion being located so that lower ends of the spaced members of the roof portion abut in end to end relationship with upper ends of the spaced members of the base portion for attachment to each other and, an interior portion being nested within and secured to the base portion.

2. The three piece cab construction of claim 1 wherein the roof portion is adhesively secured to the base portion.

3. The three piece cab construction of claim 1 wherein the interior portion is adhesively secured to the base portion.

4. The three piece cab construction of claim 1 wherein the base portion, roof portion, and interior portion are made of a polymer composite.

* * * * *